Oct. 18, 1949.    O. BRYANT    2,485,032
BRAKE APPARATUS
Filed Aug. 17, 1948

Orby Bryant
INVENTOR.

BY *Clarence A. O'Brien*
and *Harvey B. Jacobson*
Attorneys

Patented Oct. 18, 1949

2,485,032

UNITED STATES PATENT OFFICE 2,485,032

BRAKE APPARATUS

Orby Bryant, Rolla, Mo.

Application August 17, 1948, Serial No. 44,677

1 Claim. (Cl. 188—152)

This invention relates to brakes operated by a pressure fluid, and has particular reference to a brake apparatus which embodies adjustable devices for trapping predetermined quantities of pressure fluid in the cylinders of a pressure applying device having two pistons individually acting on the shoes of such a brake, whereby a predetermined working clearance may be obtained between said shoes and the brake drum to compensate for wear of the friction material with which the shoes are faced.

An object of the invention is to provide a brake apparatus which embodies a pressure applying device including a pair of pistons acting individually on the respective brake shoes, and separate devices adjustable for trapping different predetermined quantities of pressure fluid behind the respective pistons, so that the same working clearance may be obtained between the shoes and the drum even though the facings of the respective shoes may wear unevenly.

Another object is to provide an apparatus of the above kind by means of which the distance of travel of the pedal which operates the piston of the usual master cylinder to force the pressure fluid into the pressure applying device, may be kept at a minimum.

A further object is to provide a simple and effective apparatus of the above kind which is readily adaptable to existing brake systems.

The exact nature of the present invention will become apparent from the following description when considered in connection with the accompanying drawing, in which.

Figure 1:
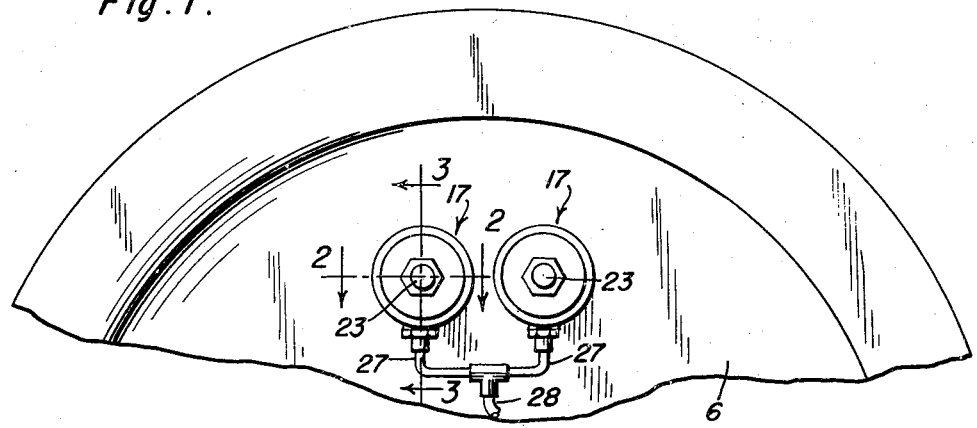
Figure 1 is a fragmentary elevational view looking at the inner side of a brake embodying the present invention.
Figure 4:
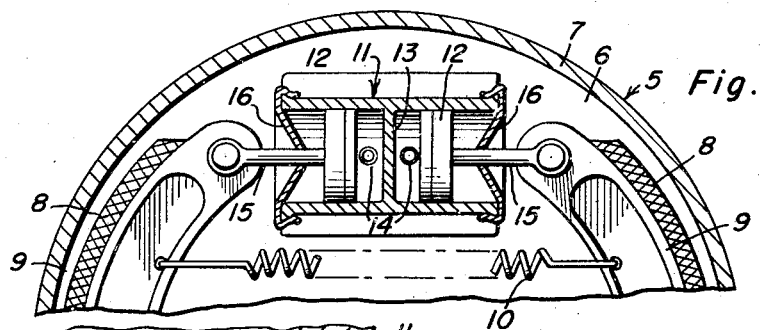
Figure 4 is a fragmentary vertical section taken through the brake to show the pressure applying device.

Referring in detail to the drawing, 5 indicates an ordinary rotatable brake drum having the usual stationary cover plate 6 at the inner side thereof. The drum 5 includes an annular flange 7 having an inner braking surface adapted to be engaged by the facings 8 of arcuate shoes 9 which are pivoted at their lower ends to the plate 6 and are disengaged from the drum by means of a tension spring 10 which connects said shoes near their upper ends.

The shoes 9 are swung into engagement with the drum flange 7 by means of a pressure applying device including a cylinder unit 11 having coaxial cylinders for two pistons 12, which cylinders are separated by a solid wall 13 and have individual inlets 14 for pressure fluid. Thrust pins 15 are pivoted to the upper ends of shoes 9 and engage the pistons 12, flexible dust caps 16 being fitted on the ends of the cylinder unit 11 and sleeved on the pins 15.

Similar separate adjustable devices 17 are provided for trapping predetermined quantities of pressure fluid behind the pistons 12. Each of these devices includes a cylinder 18 having a free valved piston 19 reciprocable therein and provided at its inner end with a discharge nipple 20 secured in an inlet 14 of a cylinder of unit 11. The piston 19 has a central opening in which is mounted a check valve 21 having a spring seated valve member 22 adapted to be unseated by brake-applying pressure and to seat upon release of such pressure. The seating spring of this valve member is normally under higher tension than the spring 10 which retracts the brake shoes. Adjustably threaded through the outer end of cylinder 18 is a stop screw 23 acting as an adjustable stop to limit the outward movement of piston 19, a jamb nut 24 being provided to lock said stop screw in adjusted positions. The nipple 20 has an inward tubular extension 25 against which the piston 19 is adapted to seat when at its innermost limit of movement, to seal the inner portion of cylinder 18 from the associated cylinder of unit 11. The extension 25 is of greater internal diameter than the valve member 22 so that the pressure fluid may freely flow past the latter when the same is open and the piston 19 is seated against said extension. Cylinder 18 has an inlet 26 for pressure fluid near its outer end and outwardly of the outer limit of movement of piston 19, and the inlets 26 of both devices 17 are connected by branches 27 to a pipe 28 leading from a common source of pressure fluid, such as the usual master cylinder having a foot pedal operated piston therein.

Figure 2:
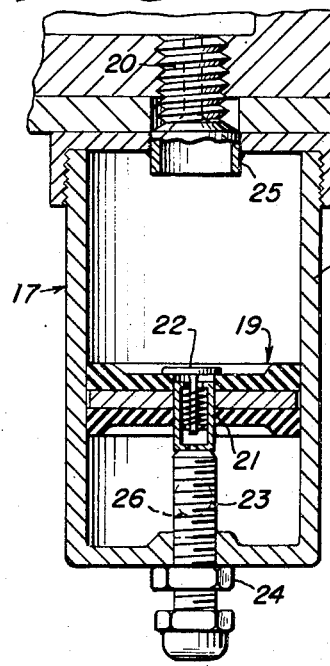
Figure 2 is an enlarged fragmentary horizontal section taken on a line 2—2 of Figure 1, with the parts disposed as they are when the brake is released.
Figure 3:
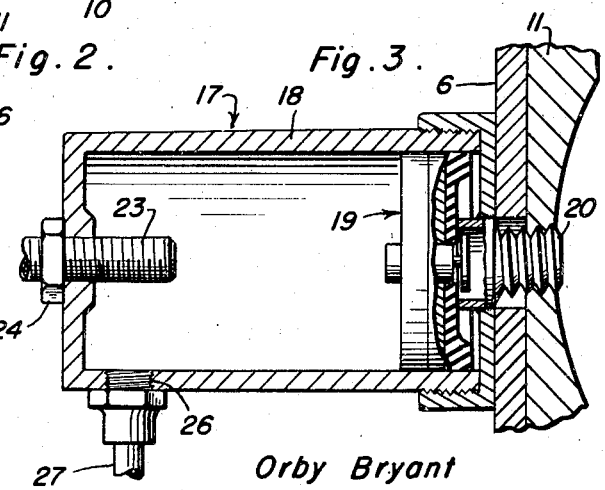
Figure 3 is an enlarged fragmentary vertical section taken on a line 3—3 of Figure 1, with the parts disposed as they are when the brake is being applied.

In operation, a brake-applying pressure in the pipe or line 28 shifts the pistons 19 inwardly from the position of Figure 2 to the position of Figure 3, so that fluid in the inner portions of cylinders 18 is forced into the cylinders of unit 11 to normally cause application of the brake. If, however, the facings 8 have worn, so that the brake is not fully applied when the pistons 19 have reached their innermost positions, additional fluid will flow past the valve members 22 into the cylinders of unit 11 to cause full application of the brake. When the pressure is again released, pistons 19 are moved outwardly until they engage the stop screws 23, because the spring 10 contracts the shoes 9 and pistons 12 force fluid from the cylinders of unit 11 into the inner portions of cylinders 18. This fluid is trapped in the cylinders 18 and behind the pistons 12 in the cylinders of unit 11, because the valve members 22 seat when the pressure is released. The extent of movement of shoes 9 away from the brake drum depends upon the extent of outward movement of pistons 19, so that adjustment of stop screws 23 will determine the working clearance between the shoes 9 and drum flange 7. As the outward movement of each shoe 9 can be separately adjusted, the same working clearance can be obtained between both shoes and the drum flange even though the facings 8 of the shoes may be worn unevenly. Also, such clearance can be predetermined to minimize the distance of brake pedal travel in effecting full application of the brake.

While one embodiment of the invention has been disclosed in detail, it will be apparent that the scope of the invention is not limited thereto other than by the terms of the appended claim.

What is claimed as new is:

Brake apparatus comprising a pair of shoes, two pressure applying devices separately acting on the shoes, and an automatically acting device for trapping a quantity of fluid in each applying device, each trapping device including a cylinder, a valved piston freely reciprocable in said cylinder, adjustable means to variably limit travel of the piston in brake releasing direction, the piston valve of each trapping device including a movable valve member having a spring urging it to seating position at the inner side of the piston in brake releasing direction, and a tubular outlet member projecting into the cylinder for seating of the piston against the same in brake-applying direction, said outlet member being of greater diameter than and adapted to accommodate said valve member when the latter is open, said shoes having a spring urging them to release position which is of lesser tension than the valve spring.

ORBY BRYANT.

REFERENCES CITED

The following references are of record in the file of this patent:

UNITED STATES PATENTS

| Number | Name | Date |
|---|---|---|
| 2,140,752 | La Brie | Dec. 20, 1938 |

FOREIGN PATENTS

| Number | Country | Date |
|---|---|---|
| 365,069 | Great Britain | July 6, 1931 |
| 377,478 | Great Britain | July 28, 1932 |